(12) United States Patent
Moy et al.

(10) Patent No.: US 11,912,430 B2
(45) Date of Patent: Feb. 27, 2024

(54) SYSTEMS AND METHODS FOR DISPLAYING A PILOT DISPLAY FOR AN AIRCRAFT

(71) Applicant: BETA AIR, LLC, South Burlington, VT (US)

(72) Inventors: Nicholas Moy, South Burlington, VT (US); Collin Freiheit, Burlington, VT (US); Joshua E. Auerbach, Waterbury Center, VT (US)

(73) Assignee: BETA Technologies, Inc., South Burlington, VT (US)

( * ) Notice: Subject to any disclaimer, the term of this patent is extended or adjusted under 35 U.S.C. 154(b) by 0 days.

(21) Appl. No.: 17/732,354

(22) Filed: Apr. 28, 2022

(65) Prior Publication Data
US 2023/0348093 A1 Nov. 2, 2023

(51) Int. Cl.
- *B64D 43/00* (2006.01)
- *G08G 5/00* (2006.01)
- *B64C 29/00* (2006.01)
- *B64D 27/24* (2006.01)

(52) U.S. Cl.
CPC .............. *B64D 43/00* (2013.01); *B64C 29/00* (2013.01); *G08G 5/0039* (2013.01); *B64D 27/24* (2013.01)

(58) Field of Classification Search
CPC ........ B64D 43/00; B64D 27/24; B64C 29/00; G05D 1/00445; G01C 23/00; G08G 5/0039; G08G 5/025
See application file for complete search history.

(56) References Cited

U.S. PATENT DOCUMENTS

| | | | | |
|---|---|---|---|---|
| 3,181,810 A | * | 5/1965 | Olson | B64C 29/0033 244/66 |
| 4,896,154 A | | 1/1990 | Factor et al. | |
| 8,497,803 B1 | | 7/2013 | Baker et al. | |
| 9,908,616 B1 | * | 3/2018 | Horn | B64C 29/0033 |
| 11,124,289 B2 | * | 9/2021 | McCullough | G05D 1/0858 |
| 11,181,934 B1 | * | 11/2021 | P R | B64D 45/00 |
| 11,299,287 B1 | * | 4/2022 | Moy | B64C 11/00 |
| 11,312,478 B2 | * | 4/2022 | Palumbo | B64C 11/50 |
| 11,386,800 B1 | * | 7/2022 | Moy | G09B 9/206 |
| 2005/0162425 A1 | | 7/2005 | Kyle et al. | |
| 2006/0025898 A1 | * | 2/2006 | Charles | G05D 1/0688 701/9 |
| 2007/0150173 A1 | | 6/2007 | Neef et al. | |
| 2009/0112464 A1 | | 4/2009 | Belcher | |
| 2010/0094487 A1 | | 4/2010 | Brinkman | |
| 2012/0259669 A1 | | 10/2012 | Stilwell et al. | |
| 2013/0020429 A1 | * | 1/2013 | Kroo | B64C 29/0025 244/6 |

(Continued)

*Primary Examiner* — Benjamin P Lee
(74) *Attorney, Agent, or Firm* — Lee & Hayes, P.C.

(57) ABSTRACT

In an aspect of the present disclosure a pilot display system for an aircraft includes a sensor configured to measure an aircraft position and generate a position datum based on the aircraft position, a display incorporated in the aircraft, and a computing device communicatively connected to the sensor and the display, the computing device configured to receive a flight path including a transition point, determine, from the position datum, the aircraft position relative to the transition point, and command the display to display a visual representation of the aircraft position relative to the transition point.

20 Claims, 6 Drawing Sheets

(56) References Cited

U.S. PATENT DOCUMENTS

| | | | |
|---|---|---|---|
| 2016/0068267 A1* | 3/2016 | Liu | G05D 1/0061 |
| | | | 701/4 |
| 2016/0117853 A1* | 4/2016 | Zhong | B64D 47/08 |
| | | | 345/634 |
| 2018/0321676 A1* | 11/2018 | Matuszeski | G05D 1/0016 |
| 2019/0041233 A1 | 2/2019 | Duerksen | |
| 2019/0161169 A1* | 5/2019 | Palumbo | B64C 11/50 |
| 2019/0162555 A1* | 5/2019 | Youssef | B64D 43/00 |
| 2019/0235502 A1* | 8/2019 | Lindsey | B64C 39/024 |
| 2019/0236358 A1* | 8/2019 | Tokumaru | G06V 20/188 |
| 2020/0074869 A1 | 3/2020 | Root et al. | |
| 2020/0333805 A1* | 10/2020 | English | B64C 13/0421 |
| 2020/0354049 A1* | 11/2020 | Noppel | G05D 1/0088 |
| 2021/0094700 A1* | 4/2021 | Bergeron | B64D 45/00 |
| 2021/0118311 A1 | 4/2021 | Nakazawa et al. | |
| 2021/0362848 A1* | 11/2021 | Spencer | B64D 17/025 |
| 2022/0135228 A1* | 5/2022 | Morrison | G05D 1/0669 |
| | | | 701/3 |
| 2022/0144421 A1* | 5/2022 | Rimanelli | B64D 27/24 |

* cited by examiner

SYSTEMS AND METHODS FOR DISPLAYING A PILOT DISPLAY FOR AN AIRCRAFT

FIELD OF THE INVENTION

The present invention generally relates to the field of aircraft. In particular, the present invention is directed to systems and methods for displaying a pilot display for an aircraft.

BACKGROUND

The field of aircraft, specifically electric aircraft, continue to develop in innovation. However, pilot displays can lack helpful information for the pilot.

SUMMARY OF THE DISCLOSURE

In an aspect of the present disclosure is a pilot display system for an aircraft including a sensor configured to measure an aircraft position and generate a position datum based on the aircraft position, a display incorporated in the aircraft, and a computing device communicatively connected to the sensor and the display, the computing device configured to receive a flight path including a transition point, determine, from the position datum, the aircraft position relative to the transition point, and command the display to display a visual representation of the aircraft position relative to the transition point.

In another aspect of the present disclosure is a method for displaying a pilot display for an aircraft including receiving, at the computing device, a flight path including a transition point, determining, at the computing device and from the position datum, the aircraft position relative to the transition point, and commanding, by the computing device, the display to display a visual representation of the aircraft position relative to the transition point.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for displaying a pilot display for an aircraft. In an embodiment, a sensor may measure a current position of an aircraft and a computing device receives the datum. The computing device also receives a flight path including a transition point and determines the aircraft position relative to the transition point. The computing device is configured to command a display to display a visual representation of the current aircraft position relative to the transition point. The aircraft may be an electric vertical takeoff and landing (eVTOL) aircraft capable of rotor-based flight and fixed-wing flight. The display may be configured to represent the transition between the two styles of flight, which may assist the pilot in correctly performing a smooth transition from rotor-based takeoff to fixed-wing flight and from fixed-wing flight to rotor-based landing. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper," "lower," "left," "rear," "right," "front," "top," "bottom," "up," "down," "vertical," "horizontal," "forward," "backward" and derivatives thereof relate to embodiments oriented as shown for exemplary purposes in FIG. 2.

Figure 1:
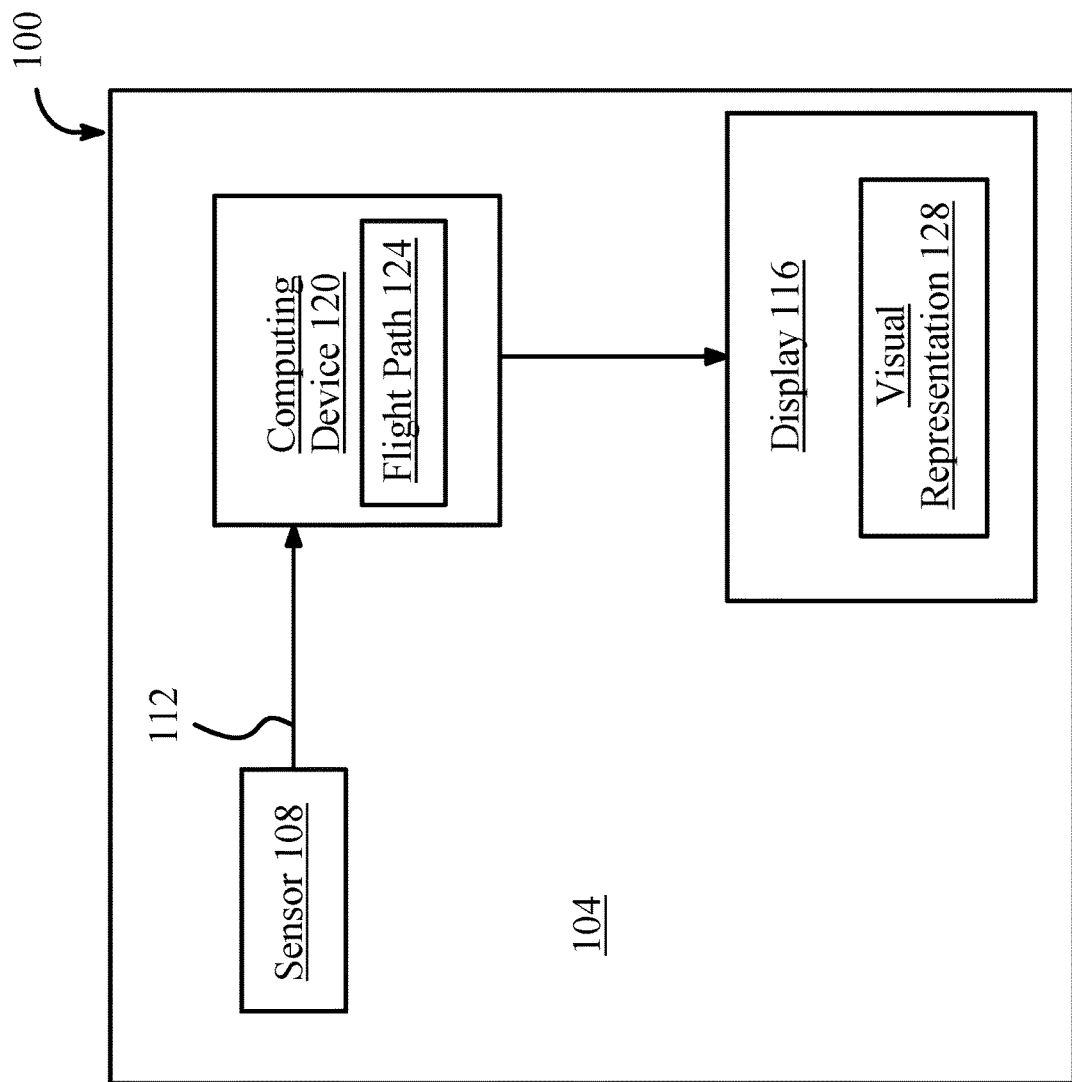
FIG. 1 is a block diagram of an exemplary pilot display system for an aircraft according to an embodiment of the present disclosure.

Now referring to FIG. 1, a pilot display system 100 for an aircraft is illustrated. Aircraft 104 may be powered by one or more electric motor. Aircraft 104 may include electrical vertical takeoff and landing (eVTOL) aircraft, helicopter, unmanned electric aircrafts (UAVs), drones, rotorcraft, commercial aircraft, and/or the like. Aircraft 104 may include one or more components that generate lift, including without limitation wings, airfoils, rotors, propellers, jet engines, or the like, or any other component or feature that an aircraft may use for mobility during flight. In order, without limitation, to optimize power and energy necessary to propel an eVTOL or to increase maneuverability, the eVTOL may be capable of two styles of flight: rotor-based flight and fixed-wing flight. Specifically, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, is where the aircraft is capable of flight using wings and/or foils that generate life caused by an aircraft's forward airspeed and the shape of the wings and/or foils, such as in airplane-style flight. As used in this disclosure, "fixed-wing landing", also known as airplane-style landing, is a landing technique for an aircraft with fixed-wings in which the aircraft descends while continuing a forward motion, thus requiring a landing strip or a site with a minimum runway length to function as a landing strip.

Figure 2:
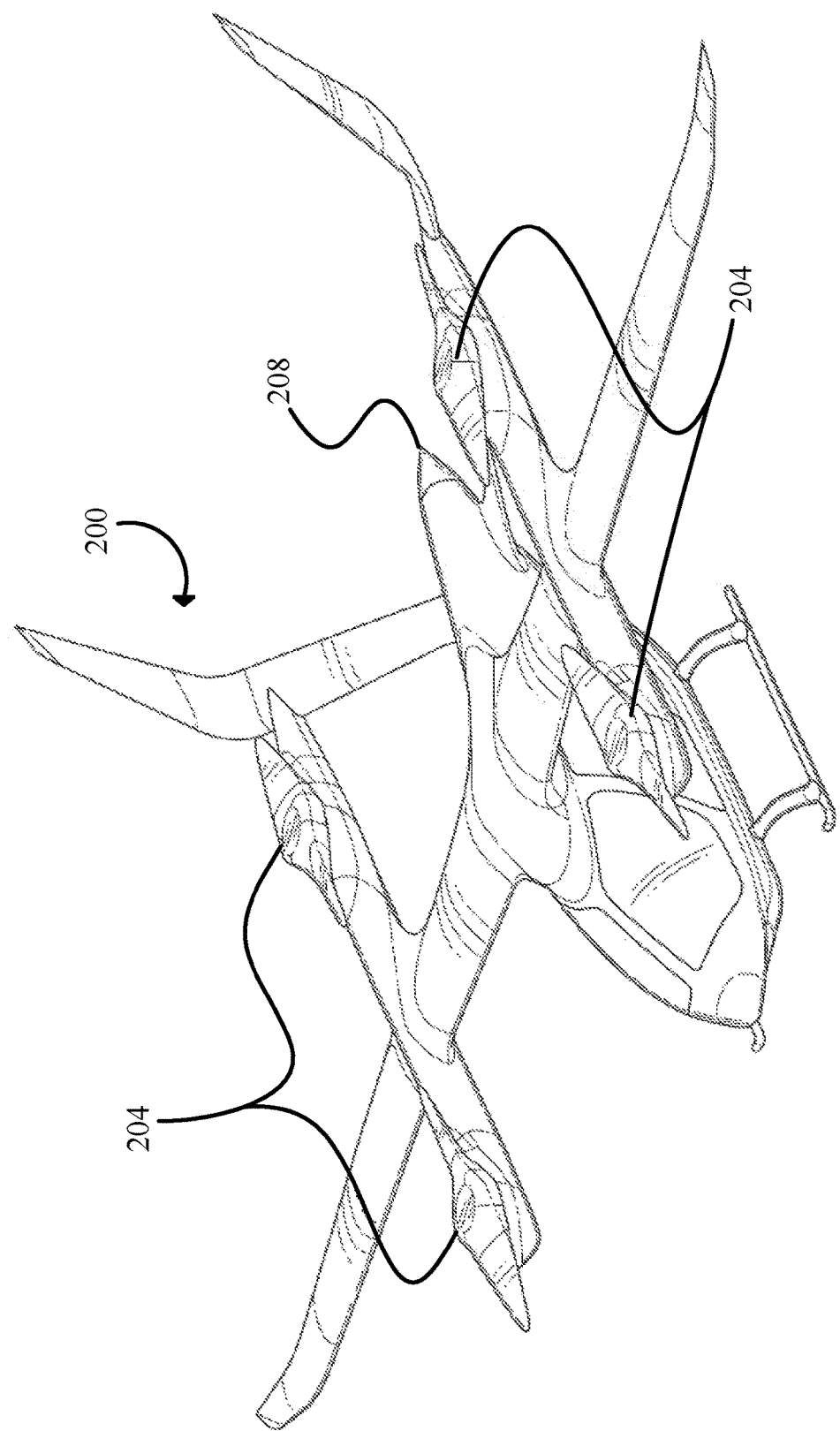
FIG. 2 illustrates an exemplary aircraft according to an embodiment of the present disclosure.

Referring now to FIG. 2, an exemplary embodiment of a dual-mode aircraft 200 that may incorporate assembly as illustrated. Aircraft may include at least a vertical propulsor 204 and at least a forward propulsor 208. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 204 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight. At least a forward propulsor 208 as used in this disclosure is a propulsor positioned for propelling an aircraft in a "forward" direction; at least a forward propulsor may include one or more propulsors mounted on the front, on the wings, at the rear, or a combination of any such positions. A non-limiting example of a forward propulsor 208 may be a pusher rotor. At least a forward propulsor may propel an aircraft forward for fixed-wing and/or "airplane"-style flight, takeoff, and/or landing, and/or may propel the aircraft forward or backward on the ground.

With continued reference to FIG. 2, in an exemplary embodiment, aircraft 200 may transition from rotor-based flight to fixed-wing flight once the aircraft 200 reaches approximately 80 knots. Aircraft 200 may perform a vertical rotor-based takeoff. Aircraft 200 may then pitch forward causing at least a vertical propulsor 204 to generate forward speed. At least a forward propulsor 208 may engage and generate additional forward speed until aircraft 200 reaches approximately 80 knots in forward air speed, at which instance the aircraft operates in fixed-wing flight and at least a vertical propulsor 204 may be disengaged and/or parked. Conversely, aircraft may transition from fixed-wing flight to rotor-based flight, for example as the aircraft 200 prepares for a vertical rotor-based landing, once the aircraft 200 slows to about 80 knots. To prepare for a vertical rotor-based landing, at least a forward propulsor 208 may operate in a reverse direction and/or increase the angle of incidence for example from between approximately 2 degrees to 4 degrees to between approximately 4 degrees to 8 degrees, causing aircraft 200 to reduce its forward speed and/or altitude. Once aircraft 200 is slowed to about 80 knots, at least a vertical propulsor 204 may be engaged to hover the aircraft and perform a vertical landing.

Still referring to FIG. 2, at least a vertical propulsor 204 and at least a forward propulsor 208 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contra-rotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

Referring again to FIG. 1, system 100 includes a sensor 108 configured to measure an aircraft position and generate a position datum 112 based on the aircraft position. As used in this disclosure, a "sensor" is a device that is configured to detect an input and/or a phenomenon and transmit information related to the detection; sensor 108 may include one or more sensors. For example, and without limitation, sensor 108 may transduce a detected phenomenon, such as a current aircraft position. As used in this disclosure, an "aircraft position", also referred to herein as "position of aircraft", is the aircraft's geolocation and may include the attitude of the aircraft, such as the aircraft's yaw, pitch, and roll; the altitude of the aircraft; the longitude and latitude coordinates of the aircraft; the instantaneous trajectory of the aircraft; and the velocity, acceleration, and jerk of the aircraft. As used in this disclosure, "position datum" is an element of data encoding one or more metrics of airplane position in an electrical signal such as a binary, analog, pulse width modulated, or other signal. Sensor 108 may include motion sensors such as which may include gyroscopes, accelerometers, and inertial measurement unit (IMU) and may be used to measure, for example, the attitude and rate of change of attitude, velocity, acceleration, and/or jerk of aircraft 104. Sensor 108 may include a geospatial sensor. As used in this disclosure, a geospatial sensor may include optical/radar/Lidar, Global Positioning System (GPS), and may be used to detect aircraft position including longitude and latitude, aircraft 104 speed, aircraft 104 altitude and whether the aircraft 104 is on the correct location of the flight plan. Sensor 108 may be configured to communicate the information to a computing device such as a controller. Sensor 108 may be mechanically and/or communicatively connected to aircraft 104. Sensor 108 may be incorporated into aircraft 104 or be remote. Sensor 108 may be a contact sensor wherein it is electrically and/or mechanically connected to an object for detection or it may be a contactless sensor. As discussed further in this disclosure below, a computing device may include a processor, a pilot control, a controller, such as a flight controller, and the like. In one or more embodiments, sensor 108 may transmit/receive signals to/from a computing device. Signals may include electrical, electromagnetic, visual, audio, radio waves, or another undisclosed signal type alone or in combination.

With continued reference to FIG. 1, system 100 includes a display 116 incorporated in aircraft 104. System 100 may include a graphical user interface (GUI) displayed on display 116. Display 116 may include one or more screens. Display 116 may include one or more projectors configured to project an image onto one or more screens. As an example, and without limitation, GUI may be displayed on any electronic device, as described herein, such as, without limitation, a computer, tablet, remote device, and/or any other visual display device. GUI may be configured to present to pilot information related to the flight plan. In one embodiment, the one or more screens may be multi-function displays (MFD). As an alternative to the screens or in conjunction with the screens, aircraft 104 may include a primary display, gauges, graphs, audio cues, visual cues, information on a heads-up display (HUD) or a combination thereof. Display 116 may include a display disposed in one or more areas of an aircraft, one or more computing devices, or a combination thereof.

Still referring to FIG. 1, display 116 may be an augmented reality display. As used in this disclosure, an "augmented reality" display is a display that permits a user to view a typical field of vision of the user and superimposes virtual images on the field of vision. As an example, and without limitation, GUI may be displayed on any electronic device, as described herein, such as, without limitation, a computer, tablet, remote device, and/or any other visual display device. Display 116 may make use of reflective waveguides, diffractive waveguides, lenses, or the like to transmit, project, and/or display images. Display 116 may include a view window, defined for the purposes of this disclosure as a portion of the augmented reality device that admits a view of field of vision; view window may include a transparent window, such as a transparent portion of goggles such as lenses or the like. Alternatively, view window may include a screen that displays field of vision to user. Display 116 may include a projection device, defined as a device that inserts images into field of vision. Where view window is a screen, projection device may include a software and/or hardware component that adds inserted images into a display signal to be rendered on display 116. Display 116 may include a liquid crystal display (LCD) and/or one or more projected lasers. Display 116 may include a heads-up display (HUD). Display 116 may be positioned in or near the line of vision of an operator of electric vehicle 108 to allow the operator to view a visual representation while maintaining vision necessary for safe operation of the electric vehicle 108. In some embodiments, display 116 may display images on one or more transparent surfaces. One or more transparent surfaces may be windows of aircraft 104, such as cockpit windows, or other transparent surfaces. In some embodiments, display 116 may include an augmented reality headset. For instance, and without limitation, display 116 may project images through and/or reflect images off an eyeglass-like structure and/or lens piece, where either both field of vision and images may be so displayed, or the former may be permitted to pass through a transparent surface. Display 116 may be incorporated in a contact lens or eye tap device, which may introduce images into light entering an eye to cause display of such images. Display 116 may display some images using a virtual retina display (VRD), which may display an image directly on a retina of a user.

Still referring to FIG. 1, display 116 may implement a stereoscopic display. A "stereoscopic display," as used in this disclosure, is a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various alternative or additional types of stereoscopic display that may be employed in an augmented reality device. In some embodiments, display 116 includes a touch screen to receive input from a user.

Still referring to FIG. 1, system 100 further includes a computing device 120 communicatively connected to sensor 108 and display 116. "Communicatively connected," for the purposes of this disclosure, is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connection an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical connection, or the like.

With continued reference to FIG. 1, computing device 120 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 120 may include a single computing device operating independently, or may include two or more computing device operating in concert, in parallel, sequentially or the like; two or more computing devices may be included together in a single computing device or in two or more computing devices. Computing device 120 may interface or communicate with one or more additional devices as described below in further detail via a network interface device. Network interface device may be utilized for connecting computing device 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 120 may include but is not limited to, for example, a computing device or cluster of computing devices in a first location and a second computing device or cluster of computing devices in a second location. Computing device 120 may include one or more computing devices dedicated to data storage, security, distribution of traffic for load balancing, and the like. Computing device 120 may distribute one or more computing tasks as described below across a plurality of computing devices of computing device, which may operate in parallel, in series, redundantly, or in any other manner used for distribution of tasks or memory between computing devices. Computing device 120 may be implemented using a "shared nothing" architecture in which data is cached at the worker, in an embodiment, this may enable scalability of system 100 and/or computing device.

With continued reference to FIG. 1, computing device 120 may be designed and/or configured to perform any method, method step, or sequence of method steps in any embodiment described in this disclosure, in any order and with any degree of repetition. For instance, computing device 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 120 may be configured to receive position datum 112 from sensor 108. Position datum 112 may include any datum discussed above. Computing device 120 is configured to receive a flight path 124. As used in this disclosure, a "flight path" is an intended path for an aircraft to travel. Flight path 124 may include a three-dimensional path through space for the intended route for aircraft 104 to remain in while traveling. Flight path 124 may include a transition in style of flight. As used in this disclosure, "transition in style of flight" is a transition from one style of flight to another style of flight, such as a transition from rotor-based flight to fixed-wing flight and/or a transition from fixed-wing flight to rotor-based flight. Flight path 124 may be based on a flight plan. Flight plan may include flight path 124. Flight plan may include the altitude, trajectory, velocity, acceleration longitude, latitude, style of flight, attitude of aircraft 104, a takeoff location, a landing location, and/or the style of takeoff and the style of landing (i.e., whether the takeoff is vertical rotor-based takeoff or fixed-wing takeoff and whether the landing is vertical rotor-based landing or fixed-wing landing). Flight path 124 may include a transition point. As used in this disclosure, "transition point" is a point or section in a flight path where transition from fixed-wing flight to rotor-based flight and/or transition from rotor-based flight to fixed-wing flight is to occur. Flight path 124 may Computing device 120 may receive flight path 124 from a database, a remote device, air traffic control, another computing device, manual input, and/or the like. Computing device 120 may be a flight controller, such as flight controller described in this disclosure. Computing device 120 may be configured to store flight path 124 in memory and retrieve the flight path 124 from memory. Computing device 120 may be configured to determine flight path 124 using any process suitable for use by a flight controller as described in this disclosure. Still referring to FIG. 1, computing device 120 is configured to determine, from position datum 112, a position of aircraft 104 relative to transition point. Computing device 120 may continuously receive current position datum 112 from sensor 108 such that position of aircraft 104 may be a current position of aircraft. Computing device 120 is configured to command display 116 to display a visual representation 128 of the position of aircraft relative to transition point. Visual representation 128 may include an icon. As used in this disclosure, an "icon" is an object or an image of an object that represents another object or thing. For example, visual representation 128 may include an icon that represents the location of flight path 124 relative to the position of aircraft. In this example, if the position of aircraft has veered to the left of flight path 124, icon may correspondingly move to the right to represent. Similarly, if aircraft is pitched forward more than according to flight path 124, icon may move up on display 116. Display 116 may include a visual representation of a cross-section of three-dimensional flight path, identifying the acceptable space for aircraft 104 to stay in while traveling. Display 116 may include a visual representation 128 of a horizon to assist a pilot in identifying the location of icon relative to the horizon and, thus, whether a trajectory of aircraft needs correction relative to the horizon. Icon may be a simple shape such as a circle, sphere, triangle, rectangle, cube, pyramid, cylinder, polygon, polyhedron, an irregular shape, and/or the like. Icon may be of any color and may be solid or merely an outline. In a non-limiting example, icon may be a green ball. Display 116 may change to indicate various events such as position of aircraft 104 deviating from flight path 124. For example, icon may change color, shade, shape, and/or size to alert pilot that aircraft 104 is deviating from flight path 124. The degree of change to icon may be based on the degree aircraft 104 has deviated from flight path 124. Icon may turn from green to yellow and/or red based on the degree of deviation from flight path 124. Display 116 may display images such as arrows to indicate corrective maneuvers to aircraft 104 to return to flight path 124. These changes by display 116 may be determined and/or tuned by using machine learning. Icon positioned on the horizon may signify that aircraft 104 is in flight path 124 and has not deviated from the flight path 124.

Figure 5:
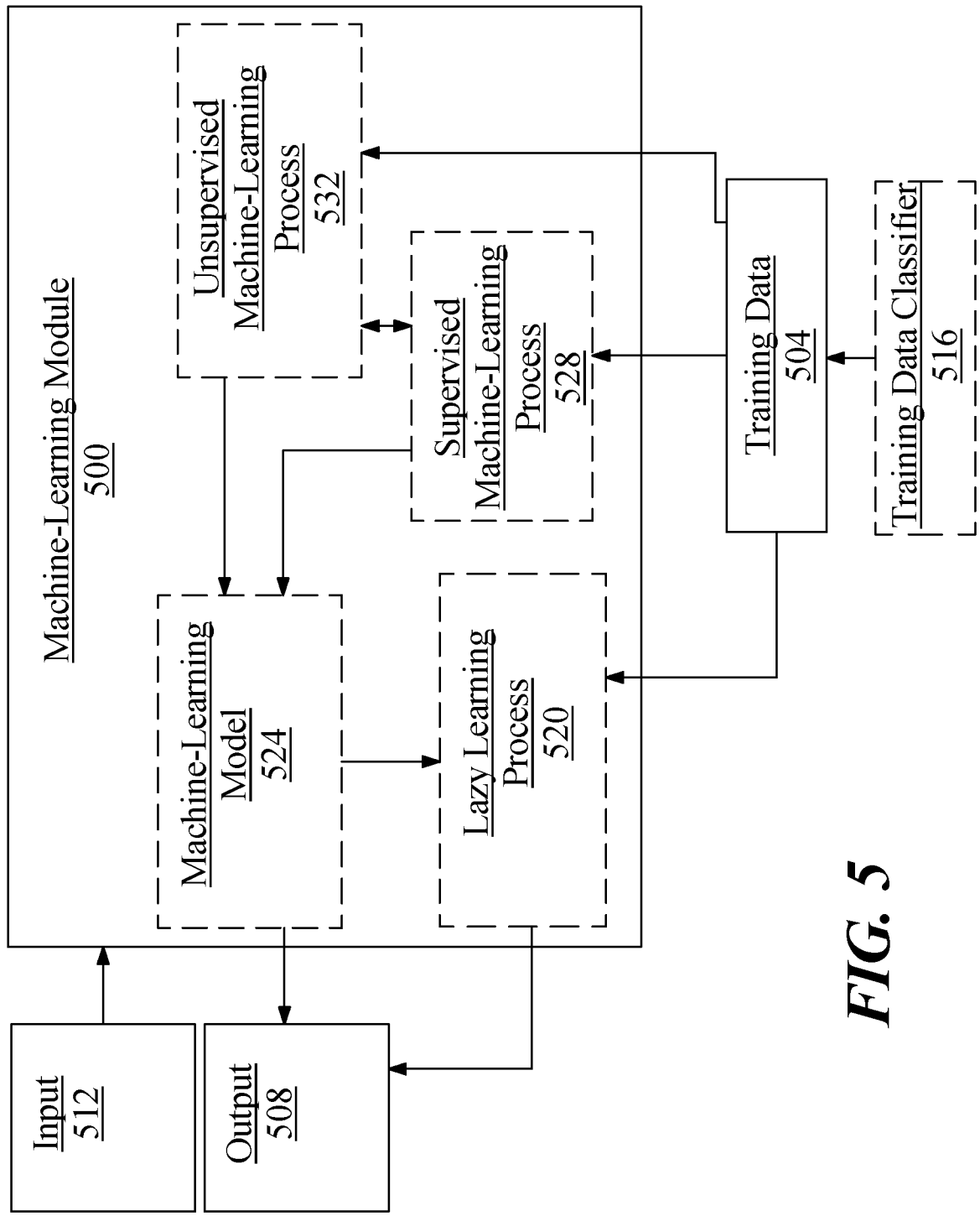
FIG. 5 is a block diagram of a machine-learning process according to an embodiment in the present disclosure.

Still referring to FIG. 1, determination of determination of flight path 124 including a transition point, determination of correct path, and/or determination of a corrected course or corrective maneuvers when aircraft 104 deviates from flight path 124 may be generated using a machine-learning model such as the machine-learning model discussed in reference to FIG. 5. Machine-learning process may be implemented by computing device 120 or another device. A flight path model may be configured to generate a flight path including a transition point using a machine-learning process as a function of a flight path training set and a departure location, an arrival location, weather information, and/or state of charge of battery. Flight paths and their corresponding departure locations, arrival locations, weather information, and/or state of charge of battery of corresponding flights may be inputted into flight path training set to train flight path training set to correlate flight paths including transition points with their corresponding departure locations, arrival locations, weather information, and/or state of charge of battery. The data inputted into flight path training set for training may be taken from previous flights for example. A flight correction model may be configured to generate a corrected course and/or corrective maneuver using a machine-learning process as a function of a flight correction training set and a flight path and a position of aircraft 104. Corrected courses and/or corrective maneuvers and their corresponding flight paths and positions of aircraft 104 may be inputted into flight path training set to train flight path training set to correlate corrected courses and/or corrective maneuvers with their corresponding flight paths and positions of aircraft 104. A corresponding flight path and position of aircraft 104 may be the relative position between flight path and aircraft 104. The data inputted into flight path training set for training may be taken from previous flights for example.

With continued reference to FIG. 1, visual representation 128 may be configured to represent a transition in style of flight. As discussed above, aircraft may perform a vertical rotor-based takeoff and transition to fixed-wing flight by increasing a forward air speed to about 80 knots, which may be accomplished at least by pitching forward aircraft so at least a vertical propulsor 204, as shown in FIG. 2, may provide a forward force on aircraft. If this maneuvered transition is included in flight path 124 and aircraft either remains level with the horizon or does not pitch forward as much as in flight path 124, then icon may appear below horizon on display 116 to an extent corresponding to the degree of correction needed for aircraft to be on course with flight path 124. However, if aircraft is pitched forward more than in flight path 124, then icon may appear above horizon on display 116 to an extent corresponding to the degree of correction needed for aircraft to be on course with flight path 124. As discussed above, aircraft may perform vertical rotor-based landing and transition from fixed-wing flight to vertical rotor-based landing by at least a forward propulsor 208 operating in a reverse direction and/or increase the angle of incidence for example from between approximately 2 degrees to 4 degrees to between approximately 4 degrees to 8 degrees, causing aircraft to reduce its forward speed and/or altitude. Flight path 124 may be based on the maneuver of transitioning from fixed-wing flight to vertical rotor-based landing and, thus, may include aircraft adjusting its pitch so that the angle of incidence is increased to between approximately 4 degrees and 8 degrees. If aircraft either remains level with the horizon or does not pitch backward as much as in flight path 124, then icon may appear above horizon on display 116 to an extent corresponding to the degree of correction needed for aircraft to be on course with flight path 124. However, if aircraft is pitched backward more than in flight path 124, then icon may appear below horizon on display 116 to an extent corresponding to the degree of correction needed for aircraft to be on course with flight path 124. In some embodiments, display 116 may include an indicator to identify when a transition is approaching in flight path 124 and/or when a transition should begin. Display 116 may be configured to display a progression of transition in style of flight. As used in this disclosure, a "progression of transition in style of flight" is the progress from the start of a maneuver to perform a transition in style of flight to the completion of the maneuver. As a non-limiting example, display 116 may indicate when a transition from rotor-based flight to fixed-wing flight and/or from fixed-wing flight to rotor-based flight begins according to flight path 124, the total duration of the transition according to flight path 124, and/or the time remaining for completing the transition. Further, display 116 may be configured to indicate where in the transition aircraft is based on the current aircraft position and/or the time remaining for completing the transition based on the current aircraft position. The progression of transition in style of flight, such as the time remaining to complete the transition, may be based on a recommended or ideal performance of the transition. The progression, as detailed above, may also include an acceptable range for performing the transition, such as an acceptable range of time remaining to complete the transition smoothly.

Figure 3:
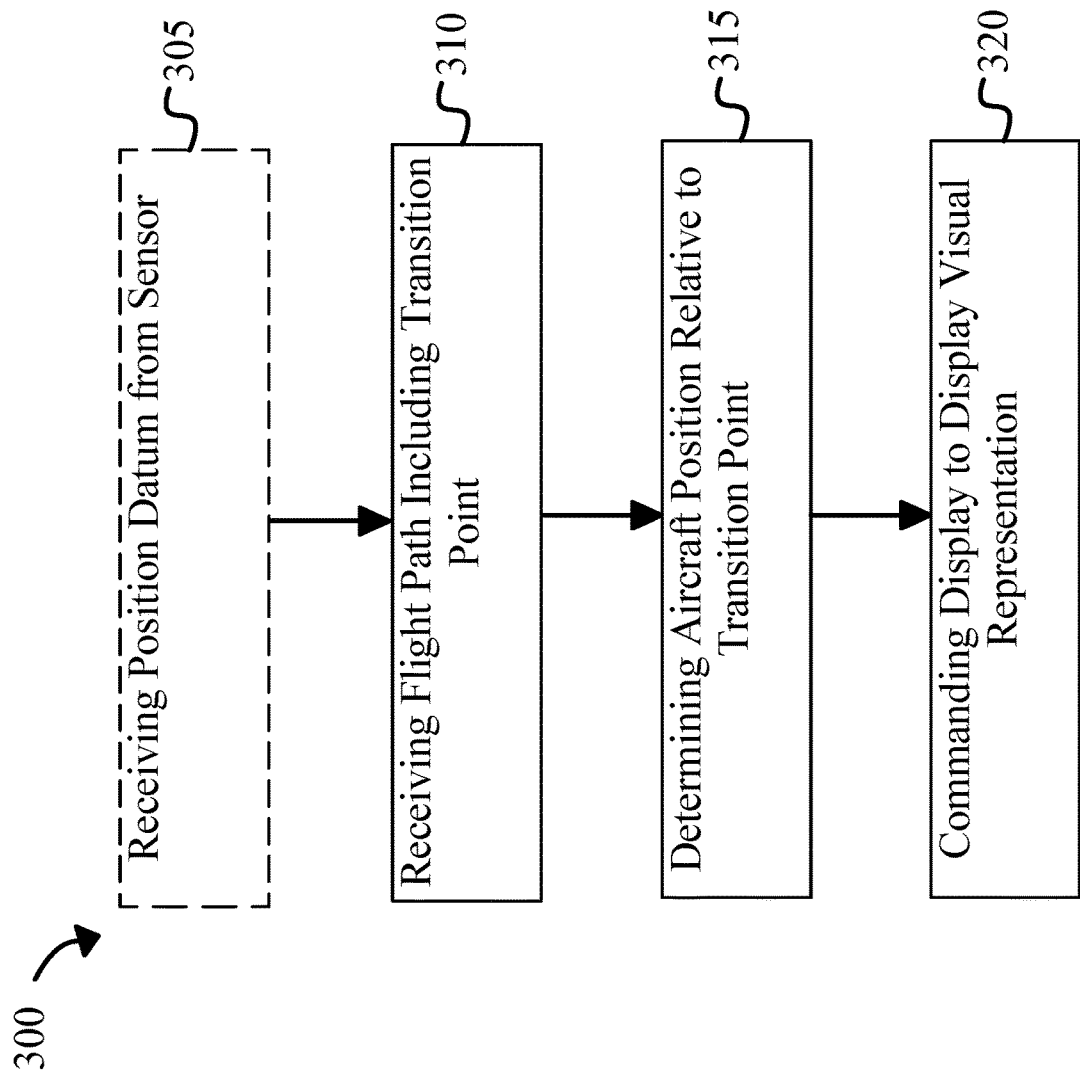
FIG. 3 is a flow diagram illustrating an exemplary method for displaying a pilot display for an aircraft according to an embodiment of the present invention.

Now referring to FIG. 3, an exemplary embodiment of a method 300 for displaying a pilot display for an aircraft is illustrated. At step 305, computing device receives a position datum from a sensor configured to measure an aircraft position and generate the position datum based on the aircraft position; this may be implemented, without limitation, as described above in reference to FIGS. 1-3. Aircraft may be an eVTOL.

At step 310, computing device receives flight path including a transition point; this may be implemented, without limitation, as described above in reference to FIGS. 1-3. Flight path may include a transition in style of flight. Flight path may be based on a flight plan. Computing device may be configured to receive flight path from another computing device.

At step 315, computing device determines, from position datum, aircraft position relative to transition point; this may be implemented, without limitation, as described above in reference to FIGS. 1-3.

At step 320, computing device commands a display to display a visual representation of aircraft position relative to transition point; this may be implemented, without limitation, as described above in reference to FIGS. 1-3. Visual representation may be configured to represent transition in style of flight. Display may be configured to display a progression of transition in style of flight. Visual representation may include an icon, wherein a position of icon is based on aircraft position relative to flight path. Display may include a visual representation of a horizon. The icon positioned on the horizon may signify that aircraft is in flight path. Display may be a heads-up display.

Figure 4:
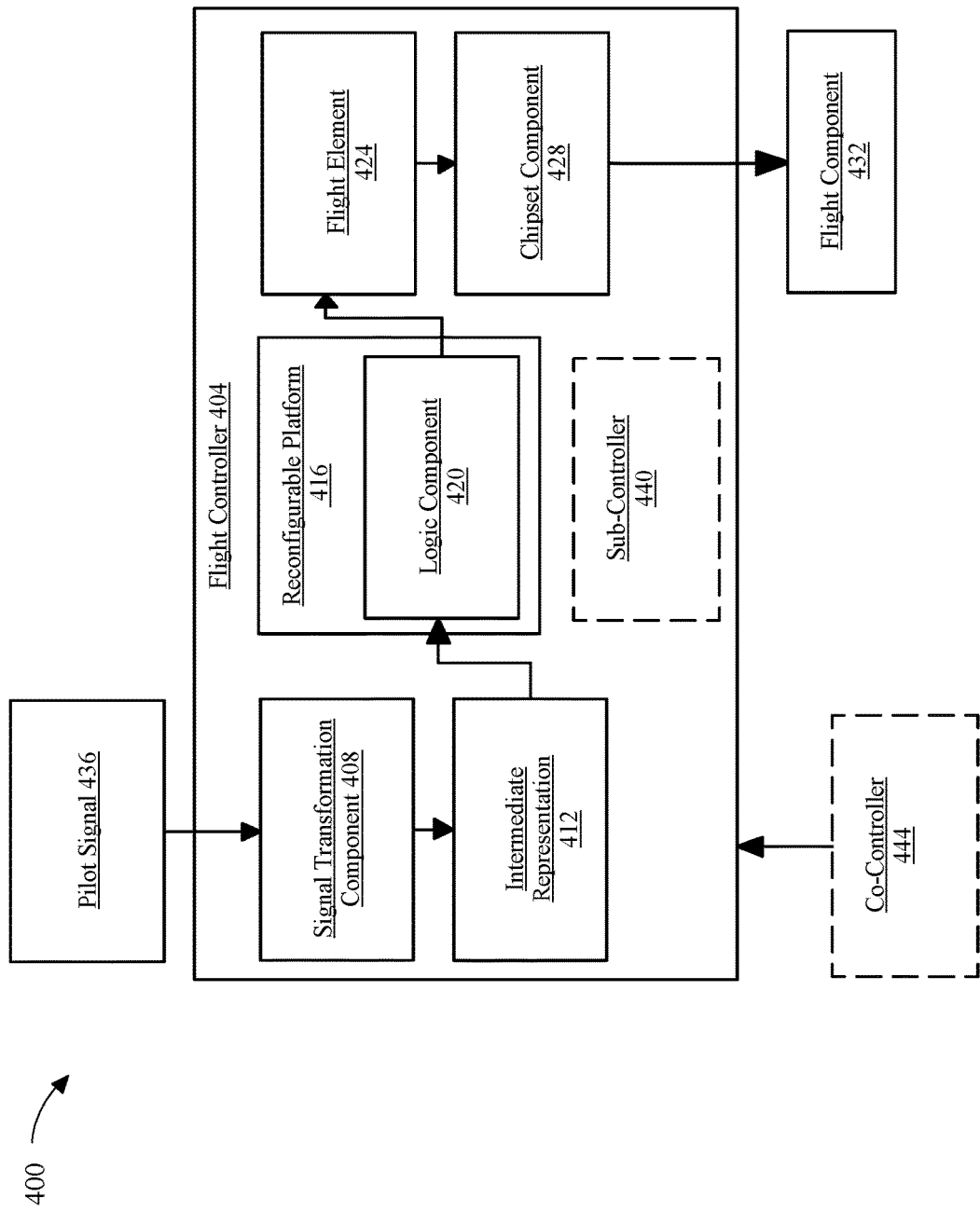
FIG. 4 is a block diagram of a flight controller according to an embodiment of the disclosure.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
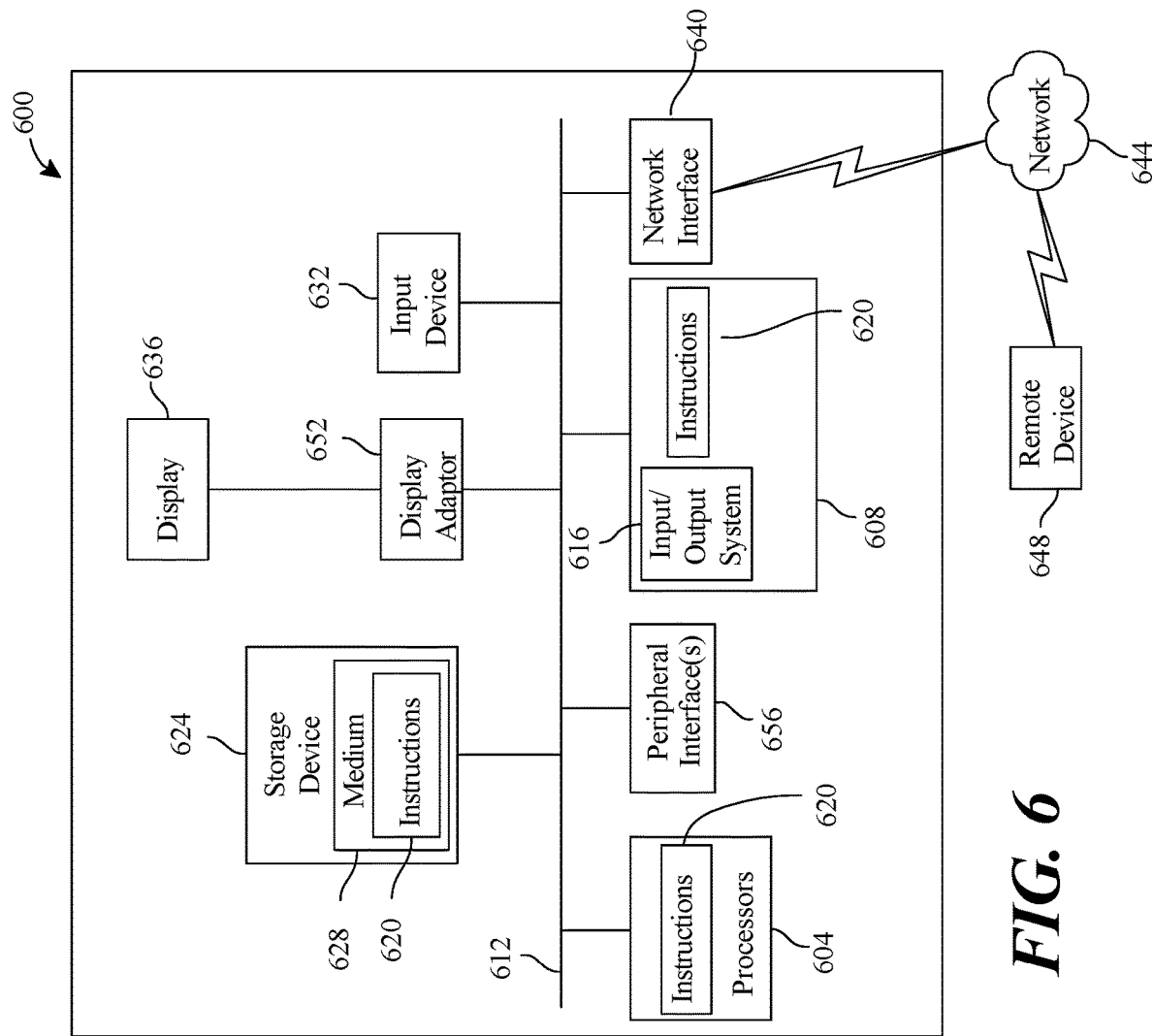
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A pilot display system for an aircraft, the system comprising:

a sensor configured to continuously measure a current aircraft position and generate a position datum based on the aircraft position;

a display incorporated in the aircraft; and a computing device communicatively connected to the sensor and the display, the computing device configured to:

receive a flight path that includes a transition point, wherein the transition point is a point in or section of the flight path where a transition will occur;

determine, from the position datum, the aircraft position relative to the transition point;

command the display to display:

a visual representation of the aircraft position relative to the transition point, wherein the visual representation comprises an icon, wherein a position of the icon is based on the aircraft position relative to the flight path; and a progression of a transition in style of flight, wherein the transition comprises transitioning between fixed-wing flight and vertical rotor-based flight; and command the display to alter a color of the icon as a function of a degree of deviation of the aircraft position from the flight path.

2. The system of claim 1, wherein the visual representation is configured to represent the transition in style of flight, wherein the visual representation further comprises a location of the icon relative to a horizon during the style in flight transition and a corresponding degree of correction for pitch of the aircraft.

3. The system of claim 1, wherein the display comprises a visual representation of a horizon, wherein the icon positioned on the horizon signifies that the aircraft is in the flight path.

4. The system of claim 1, wherein the flight path is based on a flight plan.

5. The system of claim 1, wherein the aircraft is an electric vertical takeoff and landing (eVTOL) aircraft comprising at least a vertical propulsor.

6. The system of claim 5, wherein the eVTOL comprises at least a forward propulsor.

7. The system of claim 1, wherein the transition point comprises a first altitude, the position datum comprises a second altitude, and determining, from the position datum, the aircraft position relative the transition point further comprises comparing the first altitude and the second altitude.

8. The system of claim 1, wherein the display is a heads-up display.

9. The system of claim 1, wherein the computing device is further configured to command the display to display an image of at least an arrow to indicate a corrective maneuver of the aircraft as a function of the degree of deviation of the aircraft position from the flight path.

10. The system of claim 1, wherein the flight path is based on at least a state of charge of a battery of the aircraft.

11. The system of claim 1, wherein commanding the display to display further comprises indicating an acceptable range of time remaining for completion of the transition based on the aircraft position.

12. A method for displaying a pilot display for an aircraft, the method comprising:

receiving, at a computing device, a flight path that includes a transition point, wherein the transition point is a point in or section of the flight path where a transition will occur;

determining, at the computing device and from a position datum, a current aircraft position relative to the transition point;

commanding, by the computing device, the display to display:

a visual representation of the aircraft position relative to the transition point, wherein the visual representation comprises an icon, wherein a position of the icon is based on the aircraft position relative to the flight path; and a progression of a transition in style of flight, wherein the transition comprises transitioning between fixed-wing flight and vertical rotor-based flight; and commanding, by the computing device, the display to alter a color of the icon as a function of a degree of deviation of the aircraft position from the flight path.

13. The method of claim 12, wherein the visual representation is configured to represent the transition in style of flight, wherein the visual representation further comprises a location of the icon relative to a horizon during the style in flight transition and a corresponding degree of correction for pitch of the aircraft.

14. The method of claim 12, wherein the display comprises a visual representation of a horizon, wherein the icon positioned on the horizon signifies that the aircraft is in the flight path.

15. The method of claim 12, wherein the flight path is based on a flight plan.

16. The method of claim 12, wherein the aircraft is an electric vertical takeoff and landing (eVTOL) aircraft comprising at least a vertical propulsor.

17. The method of claim 16, wherein the eVTOL comprises at least a forward propulsor.

18. The method of claim 12, wherein the transition point comprises a first altitude, the position datum comprises a second altitude, and determining, from the position datum, the aircraft position relative the transition point further comprises comparing the first altitude and the second altitude.

19. The method of claim 12, wherein the display is a heads-up display.

20. The method of claim 12, wherein commanding the display to display further comprises indicating an acceptable range of time remaining for completion of the transition based on the aircraft position.

* * * * *